(12) United States Patent
Komatsubara (10) Patent No.: US 7,830,535 B2
(45) Date of Patent: Nov. 9, 2010

(54) INFORMATION-EMBEDDING APPARATUS, MEDIUM FOR STORING INFORMATION-EMBEDDING PROGRAM, INFORMATION-EMBEDDING SYSTEM, INFORMATION-READING APPARATUS, MEDIUM FOR STORING INFORMATION-READING PROGRAM, AND INFORMATION-READING SYSTEM

(75) Inventor: Hirofumi Komatsubara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 862 days.

(21) Appl. No.: 11/687,783

(22) Filed: Mar. 19, 2007

(65) Prior Publication Data
US 2008/0074682 A1 Mar. 27, 2008

(30) Foreign Application Priority Data
Sep. 27, 2006 (JP) ............................. 2006-262531

(51) Int. Cl.
*G06F 15/00* (2006.01)
*G06F 15/16* (2006.01)
(52) U.S. Cl. ..................................... 358/1.13; 709/204
(58) Field of Classification Search ................ 358/1.13, 358/1.15, 1.14, 1.16, 1.18, 3.23, 474, 473, 358/296, 402; 709/204, 223, 224, 242; 370/401, 370/290, 493, 429, 286, 285; 379/93.13, 379/88.04, 265.01; 375/347; 715/705; 455/403, 455/554.1
See application file for complete search history.

(56) References Cited

U.S. PATENT DOCUMENTS

| 6,922,777 B1 | 7/2005 | Iwamura |
| 2001/0017885 A1 | 8/2001 | Asai et al. |
| 2005/0031097 A1* | 2/2005 | Rabenko et al. .......... 379/93.31 |

FOREIGN PATENT DOCUMENTS

| EP | 1137252 | 9/2001 |
| JP | 2000287067 | 10/2000 |
| JP | 2001242786 | 9/2001 |
| JP | 200216781 | 1/2002 |
| JP | 2002305642 | 10/2002 |

OTHER PUBLICATIONS

Office Action issued on Sep. 30, 2008 from the Korean Patent Office for corresponding Korean Patent Application Serial No. 10-2007-0034273, with English translation.

* cited by examiner

*Primary Examiner*—Saeid Ebrahimi Dehkordy
(74) *Attorney, Agent, or Firm*—Gauthier & Connors LLP (57) ABSTRACT

An information-embedding apparatus includes a first embedding unit that embeds first information into data to be printed, in accordance with a first embedding mode that allows a printing apparatus to print the embedded first information and that can be selected in accordance with the printing apparatus; a second embedding unit that embeds second information that specifies the first embedding mode, into the data to be printed, in accordance with a second embedding mode that allows the printing apparatus to print the embedded second information and that is fixed irrespective of the printing apparatus; and an instruction unit that instructs the printing apparatus to print the data to be printed in which the first information and the second information have been embedded by the first embedding unit and the second embedding unit.

13 Claims, 5 Drawing Sheets

| IP ADDRESS | MAKER NAME AND MODEL NAME OF DELIVERY PRINTER | EMBEDDING MODE |
|---|---|---|
| XXXXX | A COMPANY 300 TYPE | DIGITAL V MODE |
| YYYYY | A COMPANY 500 TYPE | ANALOG S MODE DIGITAL T MODE |
| ZZZZZ | B COMPANY bb TYPE | DIGITAL U MODE |
| | | |

INFORMATION-EMBEDDING APPARATUS, MEDIUM FOR STORING INFORMATION-EMBEDDING PROGRAM, INFORMATION-EMBEDDING SYSTEM, INFORMATION-READING APPARATUS, MEDIUM FOR STORING INFORMATION-READING PROGRAM, AND INFORMATION-READING SYSTEM

CROSS-REFERENCE TO RELATED APPLICATIONS

This application is based on and claims priority under 35 USC 119 from Japanese Patent Application No. 2006-262531 filed on Sep. 27, 2006.

BACKGROUND

1. Technical Field

The present invention relates to an information-embedding apparatus, a medium for storing an information-embedding program, an information-embedding system, an information-reading apparatus, a medium for storing an information-reading program, and an information-reading system.

2. Related Art

Techniques for embedding information into electronic data by means of digital watermarking or the like have become widely available.

SUMMARY

According to an aspect of the invention, there is provided an information-embedding apparatus, including a first embedding unit that embeds first information into data to be printed, in accordance with a first embedding mode that allows a printing apparatus to print the embedded first information and that can be selected in accordance with the printing apparatus; a second embedding unit that embeds second information that specifies the first embedding mode, into the data to be printed, in accordance with a second embedding mode that allows the printing apparatus to print the embedded second information and that is fixed irrespective of the printing apparatus; and an instruction unit that instructs the printing apparatus to print the data to be printed in which the first information and the second information have been embedded by the first embedding unit and the second embedding unit.

BRIEF DESCRIPTION OF THE DRAWINGS

Exemplary embodiments of the present invention will be described in detail by reference to the following figures, wherein.

DETAILED DESCRIPTION

Exemplary embodiments of the present invention will be described in detail with reference to the accompanying drawings.

First, a system in which delivery (issuance) of a document such as a resident card or a tax payment certificate is received at a remote location distant from a public office that issues such a document will be described as an example. In such a system, in order to secure the originality of a delivery document issued through a printer, various types of information-embedding processes may be performed with respect to a paper document to be printed. Then, the originality of the delivery document is confirmed by scanning the paper document and analyzing the information embedded in the paper document.

Figure 1:
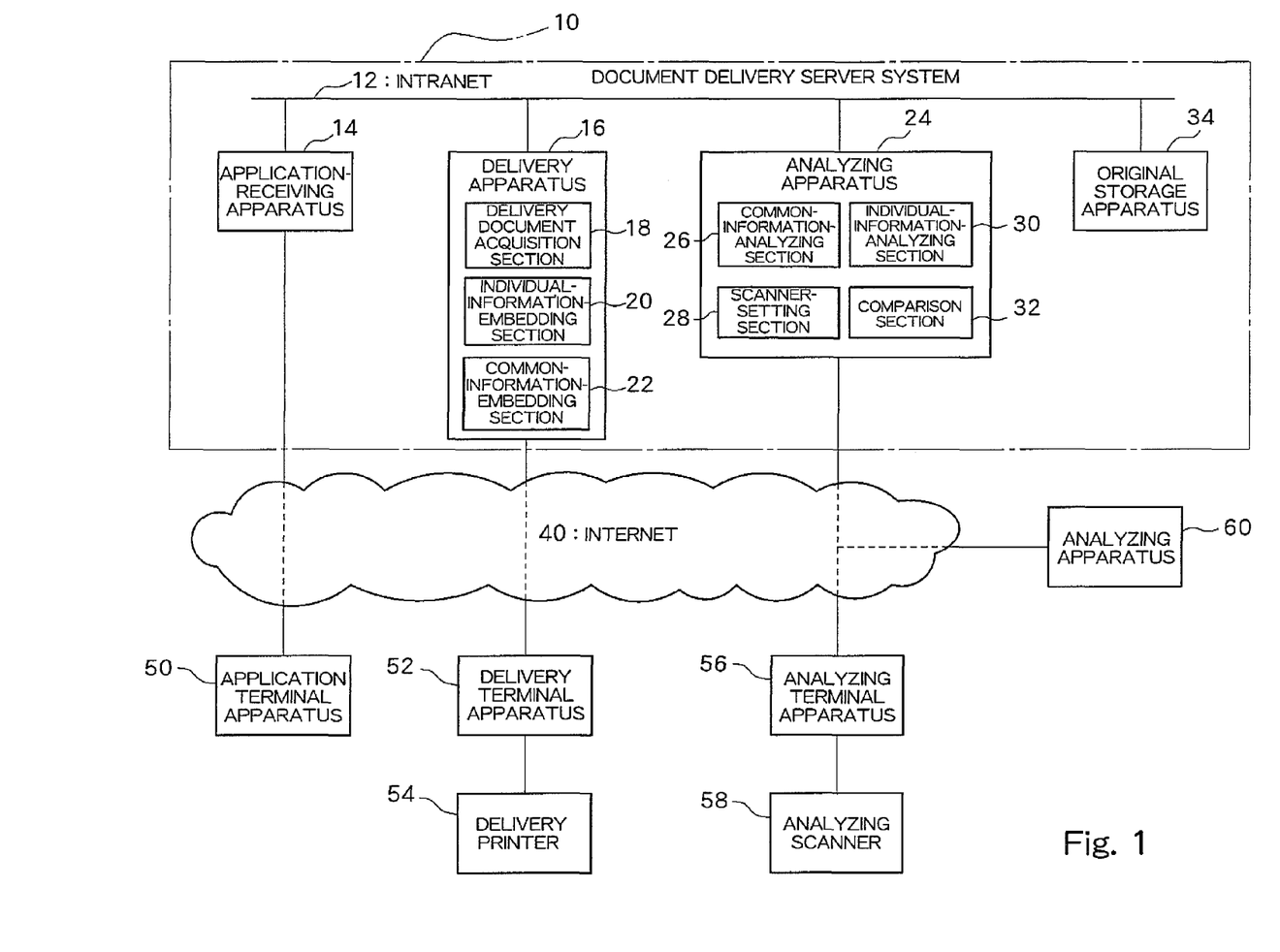
FIG. 1 is a block diagram showing an example configuration of a system according to an exemplary embodiment of the present invention.

FIG. 1 is a block diagram schematically showing a configuration of a system according to an exemplary embodiment of the invention. In this system, a document delivery server system 10 that performs document delivery or the like is connected to a group of apparatuses on the client side that receive document delivery or the like through the Internet 40.

The document delivery server system 10 includes an application-receiving apparatus 14, a delivery apparatus 16, an analyzing apparatus 24, and an original storage apparatus 34, all of which are connected to an intranet 12. Each apparatus can be constructed by installing into a computer (hardware) a program for controlling the operation of the computer. As such, various types of process functions are established on the computer. Here, although FIG. 1 shows an example in which the document delivery server system 10 is constructed as a dispersion system employing multiple computers that can communicate with each other, the system configuration may be changed in various manners. As a specific example, the document delivery server system 10 can be constructed as a centralized processing system employing a single computer.

As a group of apparatuses on the client side, an application terminal apparatus 50, a delivery terminal apparatus 52, a delivery printer 54, an analyzing terminal apparatus 56, and an analyzing scanner 58 are shown. As with the apparatuses in the document delivery server system 10, the application terminal apparatus 50, the delivery terminal apparatus 52, and the analyzing terminal apparatus 56 are constructed by installing a program in a computer. As a matter of course, the computer configuration can be set in various manners. For example, these apparatuses 50, 52, and 56 can be formed on a single computer.

Meanwhile, the delivery printer 54 and the analyzing scanner 58 are constructed from a printer (i.e., a computer having a printing function) and a scanner (i.e., a computer having a reading function), respectively. In this case, rather than using a single printer or a single scanner, an image-processing apparatus formed by housing a printer and a scanner within a single casing (which is often referred to as a copying machine or a multifunction machine) can be used. In this case, the same image-processing apparatus may be used for constructing the delivery printer 54 and the analyzing scanner 58.

As shown in FIG. 1, an additional analyzing apparatus 60 provided separately from the analyzing apparatus 24 is connected through the Internet 40. The analyzing apparatus 60 performs analysis that cannot be performed by the analyzing apparatus 24, and can be constructed by similarly installing a program in a computer.

Figure 2:
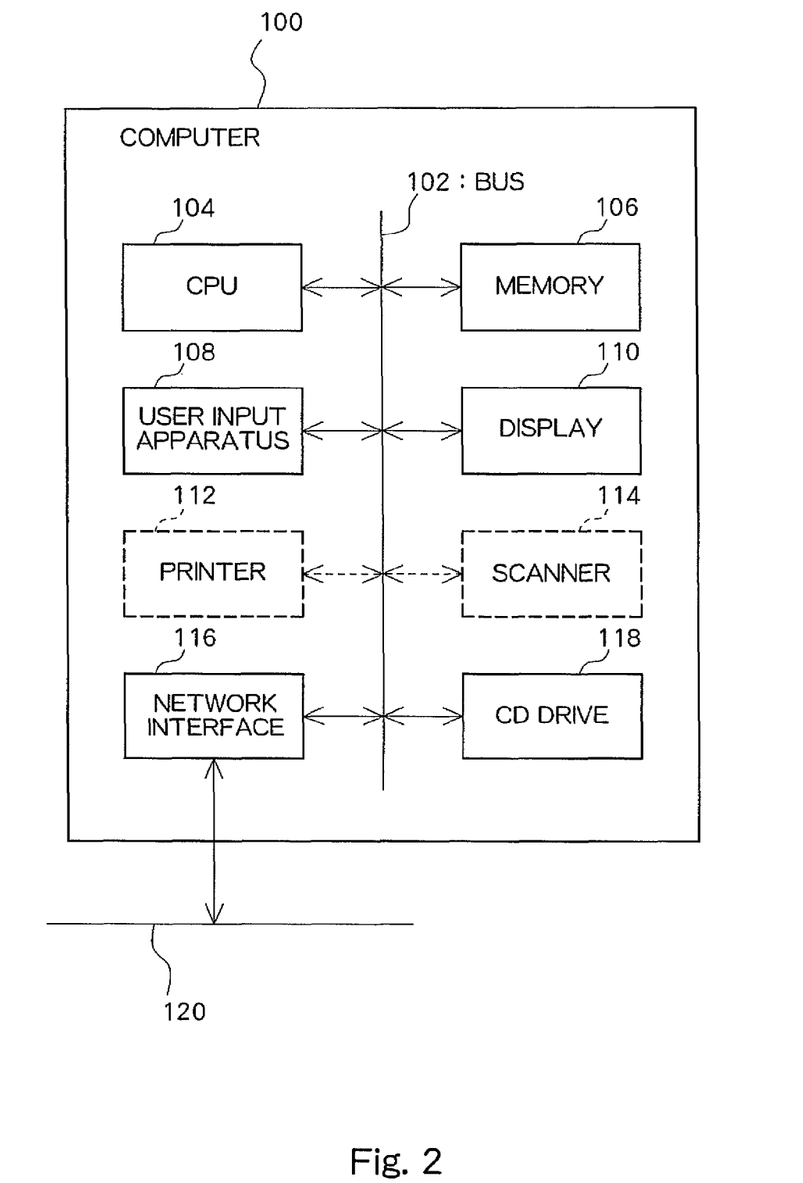
FIG. 2 is a diagram showing an example configuration of a computer according to the present exemplary embodiment.

By reference to FIG. 2, a configuration of a computer will be briefly described. A computer 100 shown in FIG. 2 includes a CPU (central processing unit) 104, a memory 106, a user input apparatus 108, a display 110, a printer 112, a scanner 114, a network interface 116, and a CD drive 118, which are connected to a bus 102 serving as a communication path within the computer.

The CPU 104 is an apparatus that processes data in accordance with a program. Specifically, the CPU 104 performs various types of operation processing and image processing instructed by a program and performs control of the various constituent elements. The memory 106 is a storage device composed of a semiconductor memory, a magnetic disk, and so on, for storing programs, data, and the like. The user input apparatus 108 is a device that is used by a user to input data, and is specifically formed from a keyboard, a touch panel, and so on. The display 110 displays image data. The printer 112 performs printing on a sheet on the basis of the image data. The scanner 114 scans a sheet to generate image data. The network interface 116 is a device that performs transmission/reception of data with respect to an external network 120. Finally, the CD drive 118 performs reading and writing with respect to a CD (compact disk) that is a storage medium.

The printer 112 and the scanner 114 are often provided in an image-processing apparatus that is specialized for image processing. Accordingly, the printer 112 and the scanner 114 are generally provided externally, as optional devices, to a general-purpose computer such as a PC (personal computer). Further, many computers lack at least one of the user input apparatus 108, the display 110, the network interface 116, and the CD drive 118.

A program for controlling the CPU 104 may be installed in the memory 106 at the stage of manufacturing the computer or, after the computer is manufactured, may be installed from the network through the network interface 116 or from the CD set in the CD drive 118.

Referring back to FIG. 1, the functional structure of each apparatus will be described.

The application-receiving apparatus 14 receives application data such as a name of a delivery document and an applicant's name from the application terminal apparatus 50 for receiving delivery of an application. The application-receiving apparatus 14 generates a receipt number and stores the receipt number in association with the application data. The application-receiving apparatus 14 further sends the receipt number back to the application terminal apparatus 50.

The delivery apparatus 16 delivers (issues) a delivery document in response to a request from the delivery terminal apparatus 52. For this purpose, the delivery apparatus 16 includes, as constituent elements, a delivery document acquisition section 18, an individual-information-embedding section 20, and a common-information-embedding section 22. Upon receiving the receipt number input from the delivery terminal apparatus 52, the delivery document acquisition section 18 acquires application data that are stored in association with the received receipt number from the application-receiving apparatus 14 and further retrieves and acquires corresponding original data from the original storage apparatus 34. Here, the original data are electronic data that represent a delivery document.

The delivery apparatus 16 also receives from the delivery terminal apparatus 52 an IP (internet protocol) address as information that specifies the delivery printer 43. The individual-information-embedding section 20 then selects an individual-information-embedding mode that allows the thus-specified delivery printer 54 to print the embedded data (hereinafter, such an individual-information-embedding mode will be referred to as a "printable individual-information-embedding mode") and embeds authentication data into copy data of the original data by means of the selected individual-information-embedding mode. In order to allow such selection, the individual-information-embedding section 20 includes a table in which the delivery printers and the printable individual-information-embedding modes are registered in association with each other. The individual-information-embedding section 20 then searches for the delivery printer 54 from this table to determine the individual-information-embedding mode to be adopted. When there are multiple individual-information-embedding modes as candidates modes for the delivery printer 54, the individual-information-embedding mode to be adopted may be determined in accordance with a previously set order of priority or in accordance with the user's instructions. Also, multiple individual-information-embedding modes may be adopted.

Here, the authentication data refer to data that are used for verifying the authenticity of a delivery document. The authentication data are stored in the original storage apparatus 34 in association with the original data. Further, when it is described that a printer can print embedded data, this means that the delivery printer 54, with its hardware capability and the capability of installed software, can print the embedded data with a required accuracy. For example, a printer for use in monochrome printing cannot print authentication data that should be printed in colors. However, in a case where a printer can print data by changing its setting at the time of printing while the printer cannot print the data under normal setting, the printer is considered to be able to print the data. As a specific example, it is possible to change the setting of a printer in which low resolution is set as normal setting, to thereby allow the printer to print authentication data with high resolution.

The common-information-embedding section 22 embeds, into the copy data of the original data, data concerning which individual-information-embedding mode that allows the delivery printer 54 to print the embedded data has been used to embed the authentication data, in accordance with a common-information-embedding mode. Here, the data to be embedded may include, in addition to the name of the printable individual-information-embedding mode, the version information of the individual-information-embedding mode, the embedding date, the name of the embedding device, the embedding parameters (information that limits the position, size, and resolution of embedding if these are arbitrary), and other information. The common-information-embedding mode is a fixed mode that is used irrespective of the selected individual-information-embedding mode. Meanwhile, with the common-information-embedding mode, settings such as the position and size of embedding, embedding algorithms, and so on are typically fixed, and these settings may be slightly modified in accordance with the size and orientation of a sheet. However, it is desirable to modify the setting within a range that allows the embedded data to be analyzed by means of the same program, so as not to deteriorate readability of the common-information-embedding mode.

The information-embedding mode as used herein refers to a mode of embedding some data into electronic data to be printed. So-called digital watermarking is an example of an information-embedding mode. The information-embedding mode may be a mode of embedding pattern data that can be read by a human such as a letter string or may be a mode of embedding symbolized pattern data such as a bar code or a QR code. Here, when secret data are to be embedded, such data are desirably embedded in the form of pattern data that cannot be read by a human. Another effective method is to use an encryption algorithm or the like to thereby make the embedded data difficult to falsify. Further, with the information-embedding mode, data may be embedded in a visible manner, such as in the form of a bar code or a QR code, such that the fact that embedding has been performed is recognized when the printed result is viewed by the human eye, or data may be embedded in an invisible manner. Also, the information-embedding mode includes an analog mode in which no implication is associated with the embedded data (therefore the degree of data matching is merely compared for verifying the authenticity) and a digital mode in which some implication is associated with the embedded data. The digital mode can be adopted as the common-information-embedding mode so as to embed information that specifies the individual-information-embedding mode.

In response to a request from the analyzing terminal apparatus 56, the analyzing apparatus 24 verifies the authenticity of a delivery document that is issued as a paper document. For this purpose, the analyzing apparatus 24 includes, as constituent elements, a common-information-analyzing section 26, a scanner-setting section 28, an individual-information-analyzing section 30, and a comparison section 32. The common-information-analyzing section 26 performs analysis of the data embedded in the common-information-embedding mode with respect to scan image data (i.e., image data generated by scanning) that are input from the analyzing terminal apparatus 56, to thereby acquire data concerning which individual-information-embedding mode is used. The scanner setting section 28 changes parameter settings of the analyzing scanner 58 such that the data embedded in accordance with the individual-information-embedding mode can be analyzed, and causes the analyzing scanner 58 to generate the scan image data once again. The parameters to be changed include, for example, the resolution of the scan image data, the ratio of lossy compression of the scan image data, the scan region, and so on.

The individual-information-analyzing section 30 extracts the authentication data embedded in accordance with the individual-information-embedding mode from the scan image data which have been regenerated. Then, the comparison section 32 obtains data to be compared with the extracted authentication data from the original storage apparatus 34 and compares the data set, thereby verifying the authenticity. The verification result is transmitted to and displayed in the analyzing terminal apparatus 56.

In some cases, the individual-information-analyzing section 30 may be unable to analyze certain individual-information-embedding modes. In order to overcome this disadvantage, it is effective to embed, by means of the common-information-embedding mode, data that specify a destination of analysis or inquiry of the individual-information-embedding mode. In this case, if the analyzing apparatus 24 cannot analyze the individual-information-embedding mode, a request or inquiry of the analysis is made with respect to the analyzing apparatus 60, for example, on the basis of the data read by the common-information-analyzing section 26.

The original storage apparatus 34 stores the original data that are an original delivery document and the authentication data embedded in an issued delivery document, and provides the requested original data or authentication data to the delivery apparatus 16 or the analyzing apparatus 24.

The application terminal apparatus 50 is located in, for example, an applicant's home or in a public facility. The applicant operates the UI (user interface) displayed on the application terminal apparatus 50 to log on to the application-receiving apparatus 14. The applicant then applies for delivery of a delivery document and obtains a receipt number from the application-receiving apparatus 14.

The delivery terminal apparatus 52 and the delivery printer 54 connected to the delivery terminal apparatus 52 are apparatuses that are used by the applicant (also referred to as a delivery-requesting person) to actually receive delivery of a delivery document. The delivery-requesting person logs on to the UI displayed on the delivery terminal apparatus 52 for inputting the receipt number or the like. The delivery terminal apparatus 52 then sends the input receipt number and the IP address of the delivery printer 54 to the delivery apparatus 16. Subsequently, the delivery terminal apparatus 52 receives printing data that represent the delivery document and causes the delivery printer 54 to print the data.

The analyzing terminal apparatus 56 and the analyzing scanner 58 connected to the analyzing terminal apparatus 56 are used for requesting analysis concerning authenticity of the document that is delivered and printed. An analysis-requesting person causes the analyzing scanner 58 to scan the printed document and generate scan image data. The analyzing terminal apparatus 56 then sends the scan image data to the analyzing apparatus 24 and obtains the analysis result which is to be displayed on the UI. Here, the analyzing apparatus 24 may request the analyzing scanner 58 to set the scan parameters or to scan the document once again, via the analyzing terminal apparatus 56.

Operation of the system shown in FIG. 1 will be described.

The applicant first operates the UI of the application terminal apparatus 50 for inputting to the application-receiving apparatus 14 the applicant's name and the name of a delivery document. Upon receiving the application data, the application-receiving apparatus 14 generates a receipt number and sends the receipt number to the application terminal apparatus 50. Further, the application-receiving apparatus 14 stores the receipt number and the application data in association with each other.

The delivery-requesting person operates the UI of the delivery terminal apparatus 52 to send the receipt number to the delivery apparatus 16. The delivery apparatus 16 obtains the application data corresponding to the receipt number from the application-receiving apparatus 14, analyzes the application data, and obtains copy data of the original data from the original storage apparatus 34. The individual-information-embedding section 20 embeds authentication data into the copy data of the obtained original data, in accordance with the individual-information-embedding mode that allows the delivery printer 54 to print the embedded data. Further, the common-information-embedding section 22 embeds data that specifies the individual-information-embedding mode into the copy data of the original data in accordance with the common-information-embedding mode, thereby completing the printing data. Here, either of the data embedding by the individual-information-embedding section 20 and the data embedding by the common-information-embedding section 22 may be performed first. It is also possible to combine data to be embedded by both the embedding sections 20 and 22 and embed the combined data into the copy data of the original data.

The delivery terminal apparatus 52 receives the printing data with regard to which data embedding has been completed, and causes the delivery printer 54 to print the received printing data. At the time of printing, the delivery printer 54 can print the data embedded in accordance with the common-information-embedding mode. Also, the setting of the printing mode (the setting of printing parameters such as sheet selection, printing size, printing orientation, and switching between color printing and monochrome printing) of the delivery printer 54 is changed as desired so as to allow printing of the data embedded in accordance with the individual-information-embedding mode.

The analysis-requesting person then causes the analyzing scanner 58 to scan the delivery document issued as a paper document. Then, the thus-generated scan image data are transmitted through the analyzing terminal apparatus 56 to the analyzing apparatus 24. The analyzing apparatus 24 starts a decode program of the common-information-embedding mode to thereby obtain data that specify the individual-information-embedding mode by which the data are embedded. When the scan image data must be regenerated for the purpose of analyzing the individual-information-embedding mode, the scanner-setting section 28 instructs the analyzing scanner 58, through the analyzing terminal apparatus 56, to change the scanning settings and scan the delivery document once again. The individual-information analyzing section 30 starts a decode program of the individual-information-embedding mode to thereby obtain the authentication data embedded in the scan image data. Then, the comparison section 32 compares the thus-extracted authentication data with the authentication data stored in the original storage apparatus 34 and verifies the authenticity of the scan image data (and also the delivery document). The determination result is displayed on the UI of the analyzing terminal apparatus 56.

Figure 3:
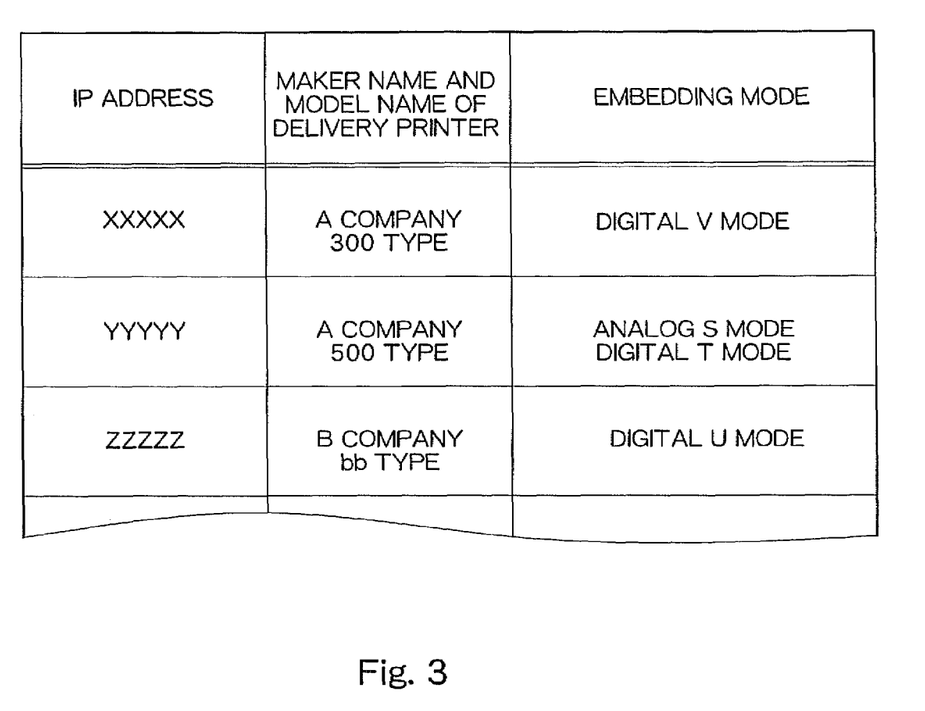
FIG. 3 is an example table in which a correspondence between distributed printers and embedding modes according to the present exemplary embodiment is registered.
Figure 4:
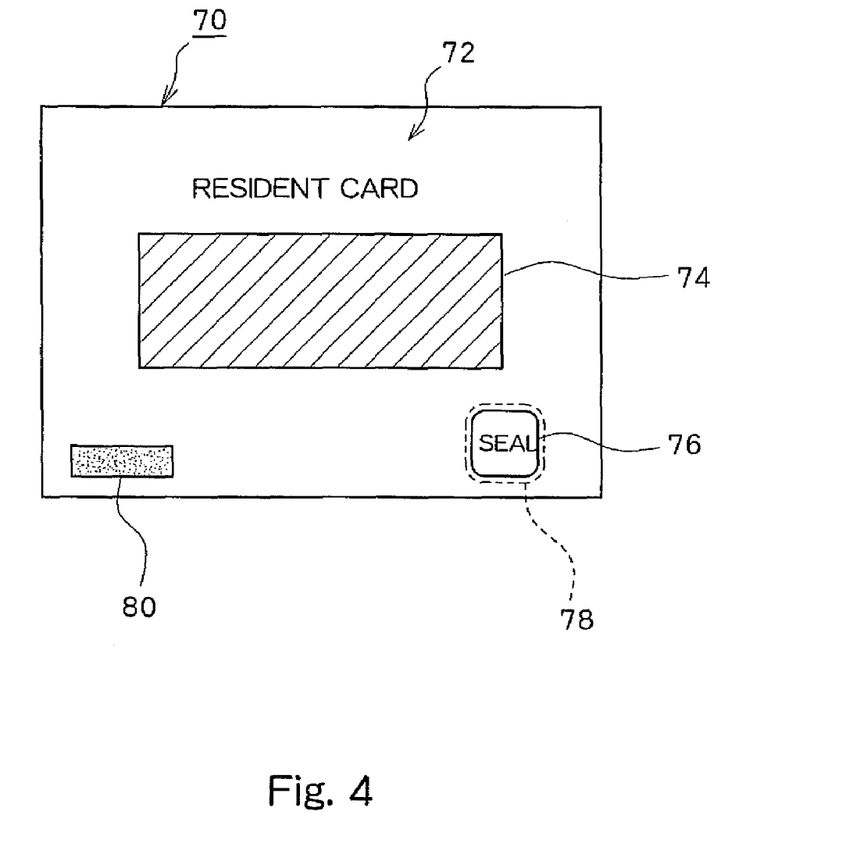
FIG. 4 is an example concerning an issued resident card which adopts a certain embedding mode according to the present exemplary embodiment.
Figure 5:
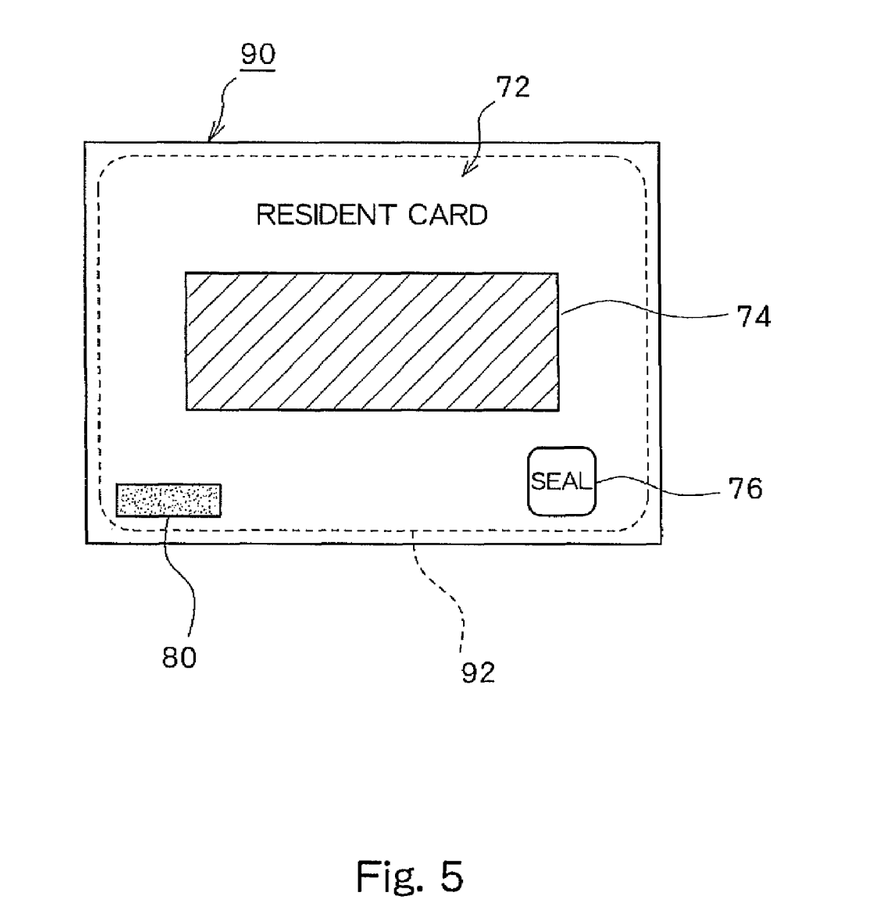
FIG. 5 is an example concerning an issued resident card which adopts another embedding mode according to the present exemplary embodiment.

Referring now to FIGS. 3 to 5, specific examples will be described.

FIG. 3 shows an example table that is used by the individual-information-embedding section 20 for selecting the individual-information-embedding mode used for data embedding. Multiple delivery printers are registered in this table, which describes, in respective columns and for the respective delivery printers, values of IP address, maker's name and model name, and printable individual-information-embedding mode.

For example, a delivery printer whose ID address is "XXXXX" is a model "300 type" manufactured by A company and supports the individual-information-embedding mode of "digital V mode" (i.e. this delivery printer can print data embedded in accordance with the "digital V mode"). Similarly, a delivery printer whose ID address is "YYYYY" is a model "500 type" manufactured by A company and supports "analog S mode" and "digital T mode," and a delivery printer whose ID address is "ZZZZZ" is a model "bb type" manufactured by B company and supports "digital U mode."

As is apparent from this example, the printable individual-information-embedding mode varies depending on the maker and model of the printer, and therefore there is a possibility that a unified information-embedding mode cannot be adopted when printers of multiple makers or multiple models exist simultaneously. Therefore, according to the present embodiment, in a system in which these multiple printers are registered as the delivery printers, once the delivery printer which is to print data is determined, the individual-information-embedding mode is selected with reference to the table shown in FIG. 3. When a number of selection candidates exist, the candidates are narrowed down on the basis of the selection condition that, among multiple individual-information-embedding modes supported by a certain delivery printer, a digital mode is adopted in preference to an analog mode. As such, when the "500 type" by "A company" shown in FIG. 3 is a target printer, the "digital T mode" is selected as the individual-information-embedding mode. Further, when the "bb type" by "B company" is a target printer, the "digital U mode" is selected as the individual-information-embedding mode.

FIG. 4 is a schematic view showing a resident card 70 that is delivered when the "500 type" by "A company" is selected as a delivery printer. The resident card 70 includes a title portion 72 in which letters "resident card" are described, a box 74 in which a name, an address, and so on are described, and a public seal 76 of a director. Further, in this resident card 70, T-mode embedded data 78 embedded in accordance with the digital T mode are embedded in an invisible manner so as to be superimposed on the public seal 76. The T-mode embedded data 78 include coded authentication data that are used for comparison. Further, common-mode-embedded data 80 are embedded near the lower left portion in the resident card 70. The common-mode-embedded data 80 are printed as a pattern having relatively rough black pixels and includes data indicating that the T-mode embedded data 78 are embedded in the resident card 70. Further, the common-mode-embedded data 78 may include data concerning scanning parameters (such as the resolution, the scanning range, and the compression ratio of the scan image data that are generated) that should be set for the scanner so as to scan the T-mode embedded data 78.

At the time of scanning of the resident card 70 by the analyzing scanner 58, setting of the analyzing scanner 58 is such that at least the common-mode-embedded data 80 can be scanned. Specifically, the analyzing scanner 58 generates scan image data including at least the lower left portion and the upper right portion (the sheet may be rotated) of the resident card 70 and having resolution higher than that of the pattern of the common-mode-embedded data 80. Then, the common-information-analyzing section 26 analyzes the common-mode-embedded data 80 included in the scan image data to thereby ascertain that the T-mode-embedded data 78 are embedded in the resident card 70. Subsequently, the scanner-setting section 28 causes the analyzing scanner 58 to change the scan parameters and regenerate scan image data including at least the lower right and upper left portions of the resident card 70 and having resolution higher than that of the pattern of the T-mode embedded data 78. The individual-information-analyzing section 30 then analyzes the thus-regenerated scan image data to thereby extract the T-mode embedded data 78.

FIG. 5 is a schematic view showing a resident card 90 that is delivered when the "bb type" by "B company" is selected as a delivery printer. Similar to the resident card 70 shown in FIG. 4, the resident card 90 includes the title portion 72, the box 74, the public seal 76, and the common-mode embedded data 80. The common-mode embedded data 80 include data indicating that U-mode embedded data 92 are embedded in this resident card 90 and data of the scan parameters that should be set for scanning the U-mode embedded data 92. Because, in this example, the U-mode embedded data 92 are embedded over the whole surface of the resident card 90, the scan parameters for setting the scan range to the whole surface are to be established.

Although in the above examples a system in which a public institution issues a delivery document has been described, the technology of the present invention is also applicable to various types of commercial and non-commercial application service providers (ASP). Further, the present invention is also applicable to a personal printing process that is performed by means of a personal computer (PC), an image-processing apparatus, and so on. Also, the data to be printed can be set to various data including a document containing letters, graphics, or an image.

Further, the data to be embedded in accordance with the individual-information-embedding mode are not limited to the authentication data, and may be attribute data that merely explain attributes of data to be printed or communication text (a message) to a recipient of the printed paper document.

Also, in the above examples, the table shown in FIG. 3 is used for previously registering the target printers that perform printing and the printable individual-information-embedding mode. However, rather than registering a target printer, it is possible, for example, to make an inquiry to the printer (or a management device of the printer) to obtain the information concerning the printable individual-information-embedding mode.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. An information-embedding apparatus, comprising: a first embedding unit that embeds first information into data to be printed, in accordance with a first embedding mode that allows a printing apparatus to print the embedded first information and that can be selected in accordance with the printing apparatus; a second embedding unit that embeds second information that specifies the first embedding mode, into the data to be printed, in accordance with a second embedding mode that allows the printing apparatus to print the embedded second information and that is fixed irrespective of the printing apparatus; and an instruction unit that instructs the printing apparatus to print the data to be printed in which the first information and the second information have been embedded by the first embedding unit and the second embedding unit, wherein the first embedding mode and the second embedding mode are set such that if a printing apparatus can print information that is embedded in accordance with the first embedding mode, the printing apparatus can print information that is embedded in accordance with the second embedding mode.

2. The information-embedding apparatus according to claim 1, further comprising: an acquisition unit that acquires information concerning embedding modes that allow the printing apparatus to print the embedded information, wherein the first embedding mode is selected on the basis of the information acquired by the acquisition unit.

3. The information-embedding apparatus according to claim 1, wherein the printing apparatus is included in a plurality of printing apparatuses that are registered, and the second embedding mode is a mode that allows the plurality of printing apparatuses to print the embedded second information.

4. A computer-readable medium storing a program causing a computer to execute a process for information embedding, the process comprising: embedding first information into data to be printed, in accordance with a first embedding mode that allows a printing apparatus to print the embedded first information and that can be selected in accordance with the printing apparatus; embedding second information that specifies the first embedding mode into the data to be printed, in accordance with a second embedding mode that allows the printing apparatus to print the embedded second information and that is fixed irrespective of the printing apparatus; and instructing the printing apparatus to print the data to be printed in which the first information and the second information have been embedded in accordance with the first embedding mode and the second embedding mode, wherein the first embedding mode and the second embedding mode are set such that if a printing apparatus can print information that is embedded in accordance with the first embedding mode, the printing apparatus can print information that is embedded in accordance with the second embedding mode.

5. The information-embedding program-storing medium according to claim 4, wherein the process further comprises acquiring information concerning embedding modes that allow the printing apparatus to print the embedded information, and the first embedding mode is selected on the basis of the information acquired by the acquisition process.

6. The information-embedding program-storing medium according to claim 4, wherein the printing apparatus is included in a plurality of printing apparatuses that are registered, and the second embedding mode is a mode that allows the plurality of printing apparatuses to print the embedded second information.

7. An information-embedding system, comprising: a printing apparatus that performs a printing process to print information on a sheet; a first embedding unit that embeds first information into data to be printed, in accordance with a first embedding mode that allows the printing apparatus to print the embedded first information and that can be selected in accordance with the printing apparatus; a second embedding unit that embeds second information that specifies the first embedding mode into the data to be printed, in accordance with a second embedding mode that allows the printing apparatus to print the embedded second information and that is fixed irrespective of the printing apparatus; and an instruction unit that instructs the printing apparatus to print the data to be printed in which the first information and the second information have been embedded by the first embedding unit and the second embedding unit, wherein the first embedding mode and the second embedding mode are set such that if a printing apparatus can print information that is embedded in accordance with the first embedding mode, the printing apparatus can print information that is embedded in accordance with the second embedding mode.

8. The information-embedding system according to claim 7, comprising: an acquisition unit that acquires information concerning embedding modes that allow the printing apparatus to print the embedded information, wherein the first embedding mode is selected on the basis of the information acquired by the acquisition unit.

9. The information-embedding system according to claim 7, wherein the printing apparatus is included in a plurality of printing apparatuses that are registered, and the second embedding mode is a mode that allows the plurality of printing apparatuses to print the embedded second information.

10. The information-embedding system according to claim 7, further comprising: a generating device that is set to allow reading of the second information embedded in accordance with the second embedding mode, and generates image data when a sheet is scanned in accordance with the setting that allows reading of the embedded second information; an acquisition unit that analyzes the image data and acquires, on the basis of the analysis result, information that specifies the first embedding mode from the second information embedded in accordance with the second embedding mode; and second instruction unit that instructs the generating device to change a setting so as to allow reading of the first information embedded in accordance with the first embedding mode and to generate new image data by rescanning the sheet in accordance with the changed setting.

11. An information-embedding method, comprising: embedding first information into data to be printed, in accordance with a first embedding mode that allows a printing apparatus to print the embedded first information and that can be selected in accordance with the printing apparatus; embedding second information that specifies the first embedding mode into the data to be printed, in accordance with a second embedding mode that allows the printing apparatus to print the embedded second information and that is fixed irrespective of the printing apparatus; and instructing the printing apparatus to print the data to be printed in which the first information and the second information have been embedded in accordance with the first embedding mode and the second embedding mode, wherein the first embedding mode and the second embedding mode are set such that if a printing apparatus can print information that is embedded in accordance with the first embedding mode, the printing apparatus can print information that is embedded in accordance with the second embedding mode.

12. The information-embedding method according to claim 11, wherein the process further comprises acquiring information concerning embedding modes that allow the printing apparatus to print the embedded information, and the firsts embedding mode is selected on the basis of the information acquired by the acquisition process.

13. The information-embedding method according to claim 11, wherein the printing apparatus is included in a plurality of printing apparatuses that are registered, and the second embedding mode is a mode that allows the plurality of printing apparatuses to print the embedded second information.

* * * * *